United States Patent
Uchiike et al.

(10) Patent No.: US 8,571,388 B2
(45) Date of Patent: Oct. 29, 2013

(54) APPARATUSES AND METHODS FOR PROCESSING VIDEO SIGNALS

(75) Inventors: Hiroshi Uchiike, Fujisawa (JP);
Hirofumi Urabe, Kawasaki (JP);
Shuntaro Aratani, Machida (JP);
Kenichi Morikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1395 days.

(21) Appl. No.: 12/030,702

(22) Filed: Feb. 13, 2008

(65) Prior Publication Data

US 2008/0199156 A1 Aug. 21, 2008

(30) Foreign Application Priority Data

Feb. 19, 2007 (JP) ................................. 2007-037799

(51) Int. Cl.
*H04N 5/92* (2006.01)
(52) U.S. Cl.
USPC ......................................................... 386/326
(58) Field of Classification Search
USPC .......................................... 386/124, 200, 326
See application file for complete search history.

(56) References Cited

U.S. PATENT DOCUMENTS

| | | | |
|---|---|---|---|
| 6,778,221 B1* | 8/2004 | Nishioka et al. | 348/459 |
| 7,310,117 B2* | 12/2007 | Hosoda et al. | 348/441 |
| 2001/0002851 A1* | 6/2001 | Shimada et al. | 348/423.1 |
| 2002/0165453 A1* | 11/2002 | Bae et al. | 600/437 |
| 2003/0076446 A1* | 4/2003 | Cho | 348/558 |
| 2005/0138569 A1 | 6/2005 | Baxter et al. | |
| 2005/0226325 A1* | 10/2005 | Dei et al. | 375/240.12 |
| 2006/0039471 A1 | 2/2006 | Dane et al. | |
| 2007/0046804 A1* | 3/2007 | Hirano et al. | 348/333.01 |

FOREIGN PATENT DOCUMENTS

| | | |
|---|---|---|
| EP | 1545128 A2 | 6/2005 |
| JP | 2002-320203 A | 10/2002 |
| JP | 2005-252870 A | 9/2005 |
| JP | 2006-025080 A | 1/2006 |
| JP | 2006-333071 A | 12/2006 |
| WO | WO01/35657 A1 | 5/2001 |
| WO | 02/001883 A1 | 1/2002 |

\* cited by examiner

*Primary Examiner* — Lisa Lewis
(74) *Attorney, Agent, or Firm* — Canon USA Inc. IP Division

(57) ABSTRACT

Conversion information regarding a method of frame-rate conversion executed in an image pickup apparatus is attached to video data, and the video data with the attached conversion information is passed to a playback apparatus. In the playback apparatus, an optimal image processing method is selected according to the conversion information.

16 Claims, 8 Drawing Sheets

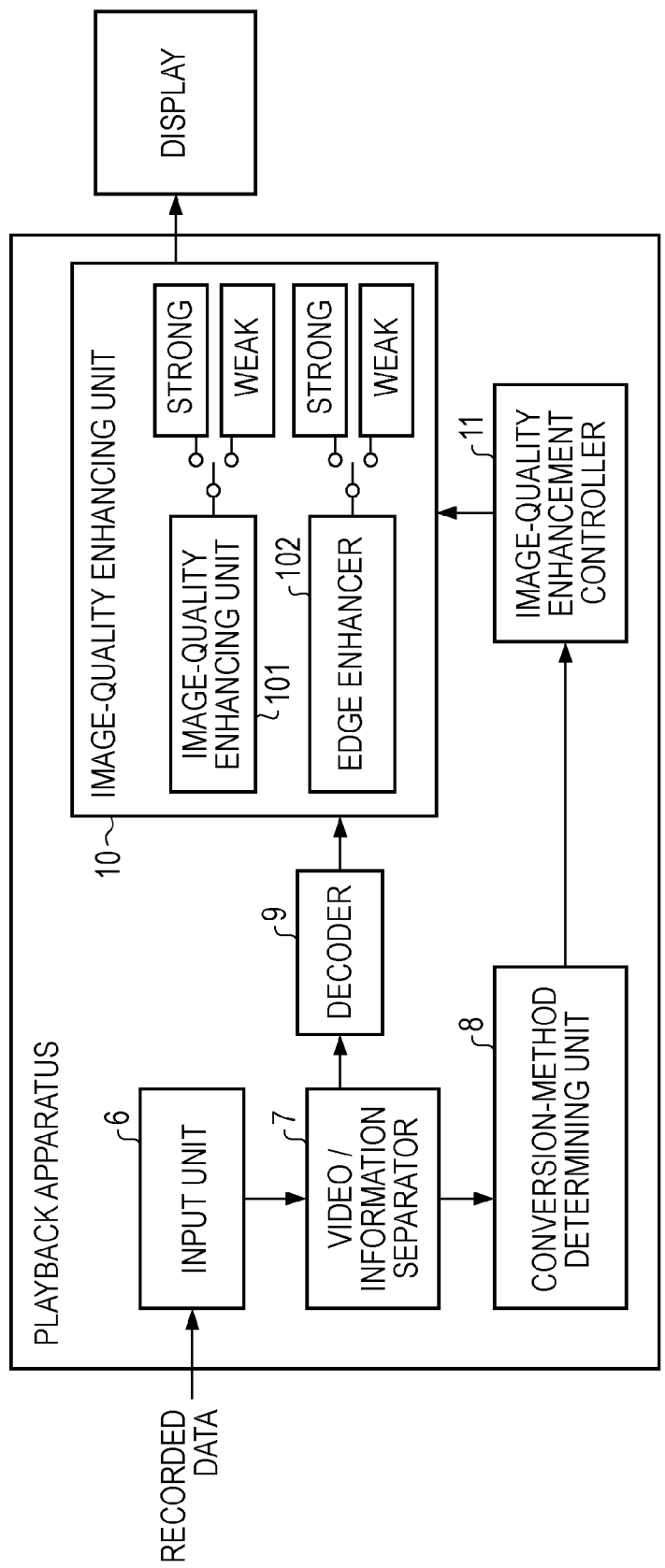

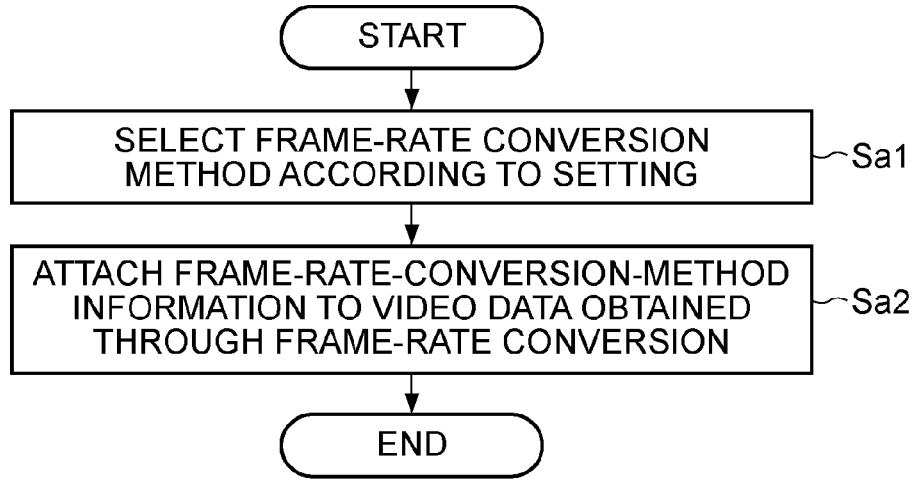
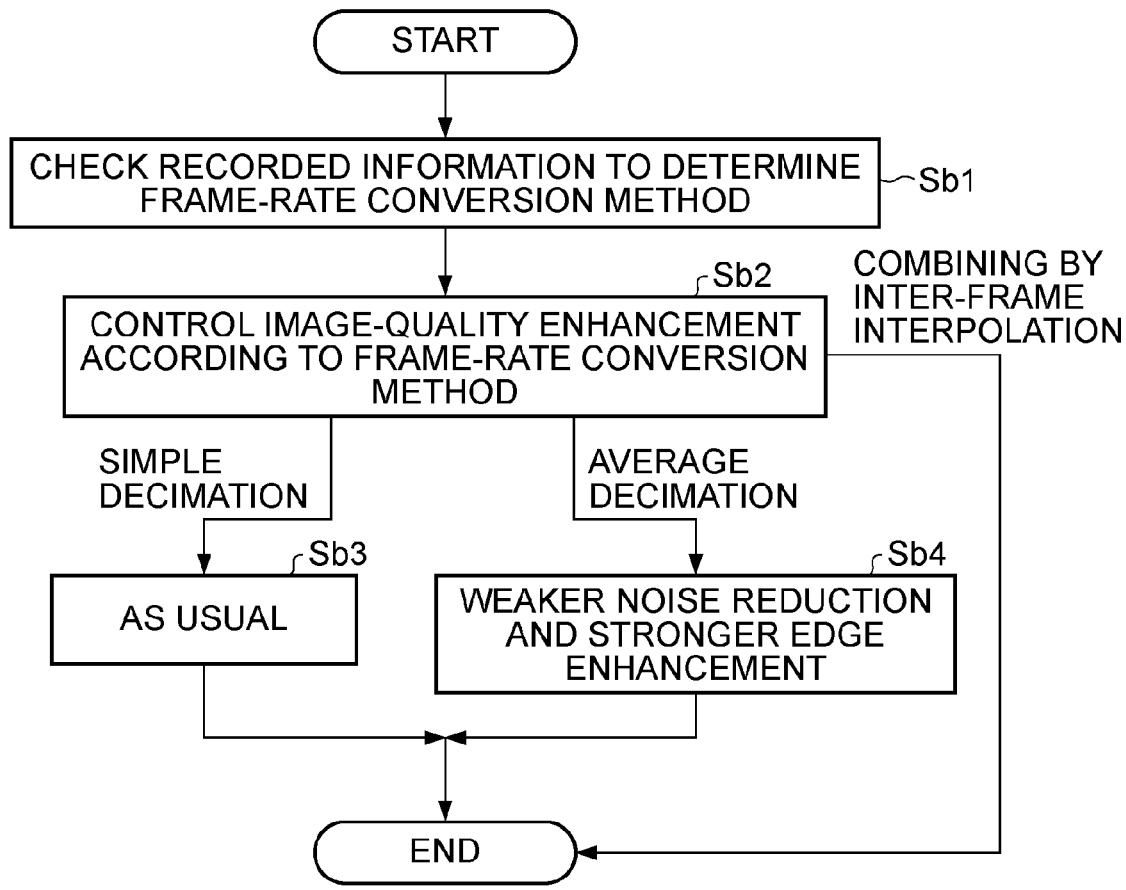

SIMPLE DECIMATION

SELECTED FRAMES ARE INDICATED BY BLANK, AND UNSELECTED FRAMES ARE INDICATED BY SHADE

SELECT OPTIMAL FRAMES

SELECTED FRAMES ARE INDICATED BY BLANK, AND UNSELECTED FRAMES ARE INDICATED BY SHADE

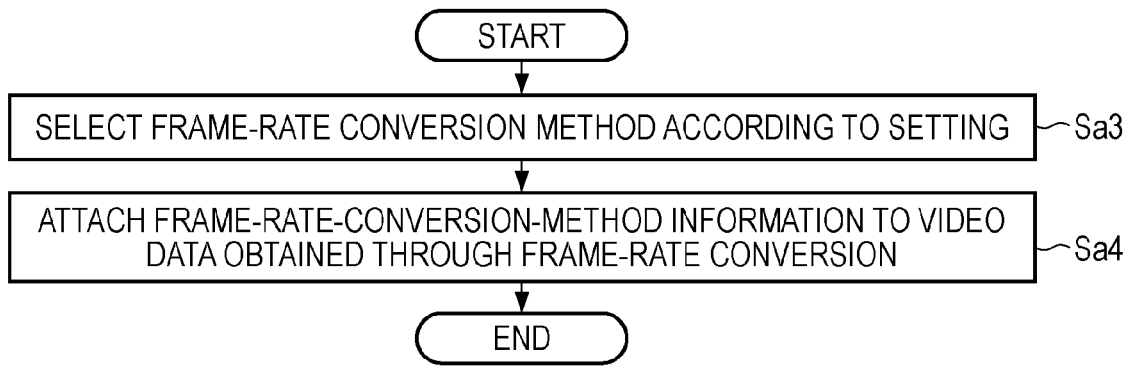
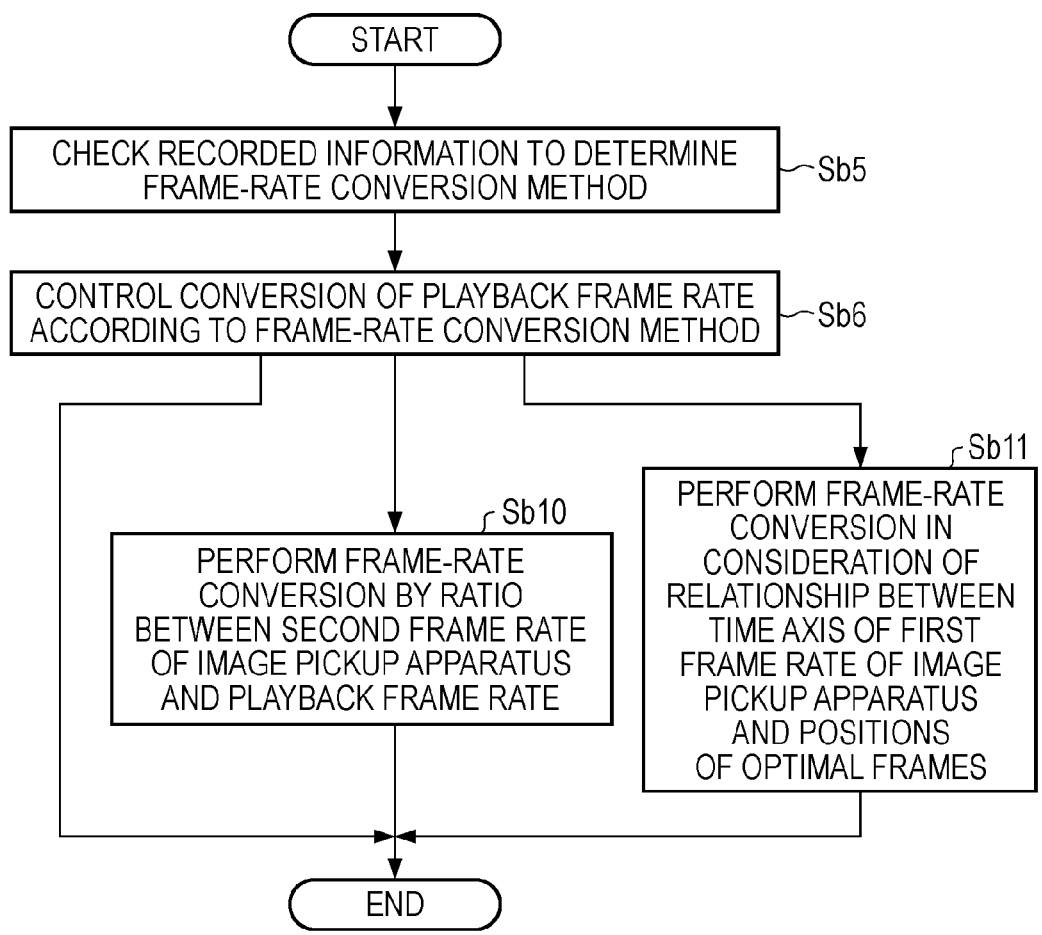

APPARATUSES AND METHODS FOR PROCESSING VIDEO SIGNALS

BACKGROUND OF THE INVENTION

1. Field of the Invention

The present invention relates to apparatuses and methods for processing video signals, for example, image pickup apparatuses and video playback apparatuses. More specifically, embodiments of the present invention relate to video systems in which a method of image-quality enhancement or playback-frame-rate conversion or other kind of processing is selected on the basis of a frame-rate conversion method of video signals. Embodiments of the present invention may advantageously be used where video signals are based on video content that has been picked up at speeds (frame rates) higher than standard broadcasting or recording frame rates.

2. Description of the Related Art

Recently, the image pickup speeds of image pickup elements are improving considerably. For example, an imaging element capable of picking up 180 image frames per second, with horizontally 1920 and vertically 1440 pixels per frame, has been made public.

With the current broadcasting standards, however, even with the high-definition standard, the imaging speed is 60 frames per second with horizontally 1920 and vertically 1080 pixels per frame. Thus, even if such a high-speed imaging element is used for image pickup, frame-rate conversion is needed for playback compliant with the standard.

As an example of related art relating to high-frame-rate image pickup and playback, according to Japanese Patent Laid-Open No. 2002-320203, at the time of high-frame-rate image pickup, video content is recorded at a standard frame rate suitable for a recording format, and information regarding an original frame rate is recorded in a separate area. At the time of playback, frame-rate conversion is executed according to the information to perform motion playback.

As another example, according to Japanese Patent Laid-Open No. 2006-025080, at the time of high-frame-rate image pickup, flags are attached to frames needed for playback at a standard frame rate, and playback is performed in accordance with the flags.

According to these techniques, since information regarding an original frame rate or the like is needed in order to suitably play back a moving picture that has been picked up, such information is additionally recorded.

Furthermore, as an example of techniques for attaching processing information, according to Japanese Patent Laid-Open No. 2005-252870, when the resolution of a compressed image is further reduced for re-compression, parameters indicating patterns for interpolation of lost high-frequency regions are additionally recorded, and the parameters are used for image-quality enhancement at the time of expansion of the re-compressed image.

Methods of achieving a desired frame rate through frame-rate conversion include a method in which one frame is generated by averaging a plurality of frames and a method in which one frame is generated by combining a plurality of frames in a complementary manner, and a method in which a desired frame rate is achieved by selecting frames with little blur.

A playback apparatus executes image-quality enhancement in a manner of its own on moving-picture data obtained through frame-rate conversion, and displays a playback image on a display. At this time, when the display uses its own frame rate, frame rate conversion is again executed at the display.

However, it has not been possible for the playback apparatus to recognize the type of frame-rate conversion executed on image data at the image pickup apparatus. Thus, there has been a possibility that the playback apparatus executes an undesired process that prohibits image-quality enhancement or that has little effect of image-quality enhancement during the course of image-quality-enhancement processes. Furthermore, there has been a possibility that the playback apparatus fails to execute playback at appropriate timing.

SUMMARY OF THE INVENTION

In an embodiment of the present invention, conversion information regarding frame-rate conversion executed at an image pickup apparatus is transferred to a playback apparatus so that image-quality enhancement or frame-rate conversion will be executed effectively at the playback apparatus.

Video signal processing apparatus according to an aspect of the present invention includes a frame-rate converting unit which receives video signals having a first frame rate and employing a conversion method to derive from the received video signals output video signals having a frame rate different from said first frame rate; and an information outputting unit which outputs conversion information associated with the output video signals, the conversion information relating to the conversion method employed by the frame-rate converting unit to derive the associated output video signals.

Image pickup apparatus according to another aspect of the present invention includes an image pickup unit which produces video signals having a first frame rate; a frame-rate converting unit which receives said video signals and employs a conversion method to derive from the received video signals output video signals having a frame rate different from said first frame rate; and an information outputting unit which outputs conversion information associated with the output video signals, the conversion information relating to the conversion method employed by the frame-rate converting unit to derive the associated output video signals.

Video playback apparatus according to another aspect of the present invention includes an input unit which receives frame-rate-converted video signals derived from original video signals having a frame rate different from said frame-rate-converted video signals, and which receives conversion information associated with the received frame-rate-converted video signals and relating to a frame-rate conversion method employed to derive those signals from the original video signals; and a processing unit which processes the received frame-rate-converted video signals in dependence upon the associated conversion information to produce playback video signals.

A recording medium according to another aspect of the present invention has recorded thereon frame-rate-converted video signals derived from original video signals having a frame rate different from said frame-rate-converted video signals, and also having recorded thereon conversion information relating to a frame-rate conversion method employed to derive those signals from the original video signals.

A method of processing video signals according to another aspect of the present invention includes, in a first apparatus, employing a conversion method to derive from received video signals having a first frame rate output video signals having a frame rate different from said first frame rate; and transferring, from said first apparatus to a second apparatus, the output video signals and conversion information associated with the output video signals and relating to the conversion method employed by the first apparatus to derive the associated output video signals; and in said second apparatus, processing the transferred video signals in dependence upon the transferred conversion information associated therewith to produce playback video signals.

According to these aspects of the present invention, when a moving picture picked up by an image pickup apparatus is played back by a playback apparatus, image-quality enhancement and frame-rate conversion are executed suitably. Thus it is possible to view a playback moving picture with an enhanced image quality and smooth motion.

Further features of the present invention will become apparent from the following description of exemplary embodiments with reference to the attached drawings.

BRIEF DESCRIPTION OF THE DRAWINGS

FIG. 2 is a block diagram of a playback apparatus according to the first embodiment.

FIGS. 4A and 4B are flowcharts according to the first embodiment.

FIGS. 9A and 9B are flowcharts according to the second embodiment.

DESCRIPTION OF THE EMBODIMENTS

Figure 1:
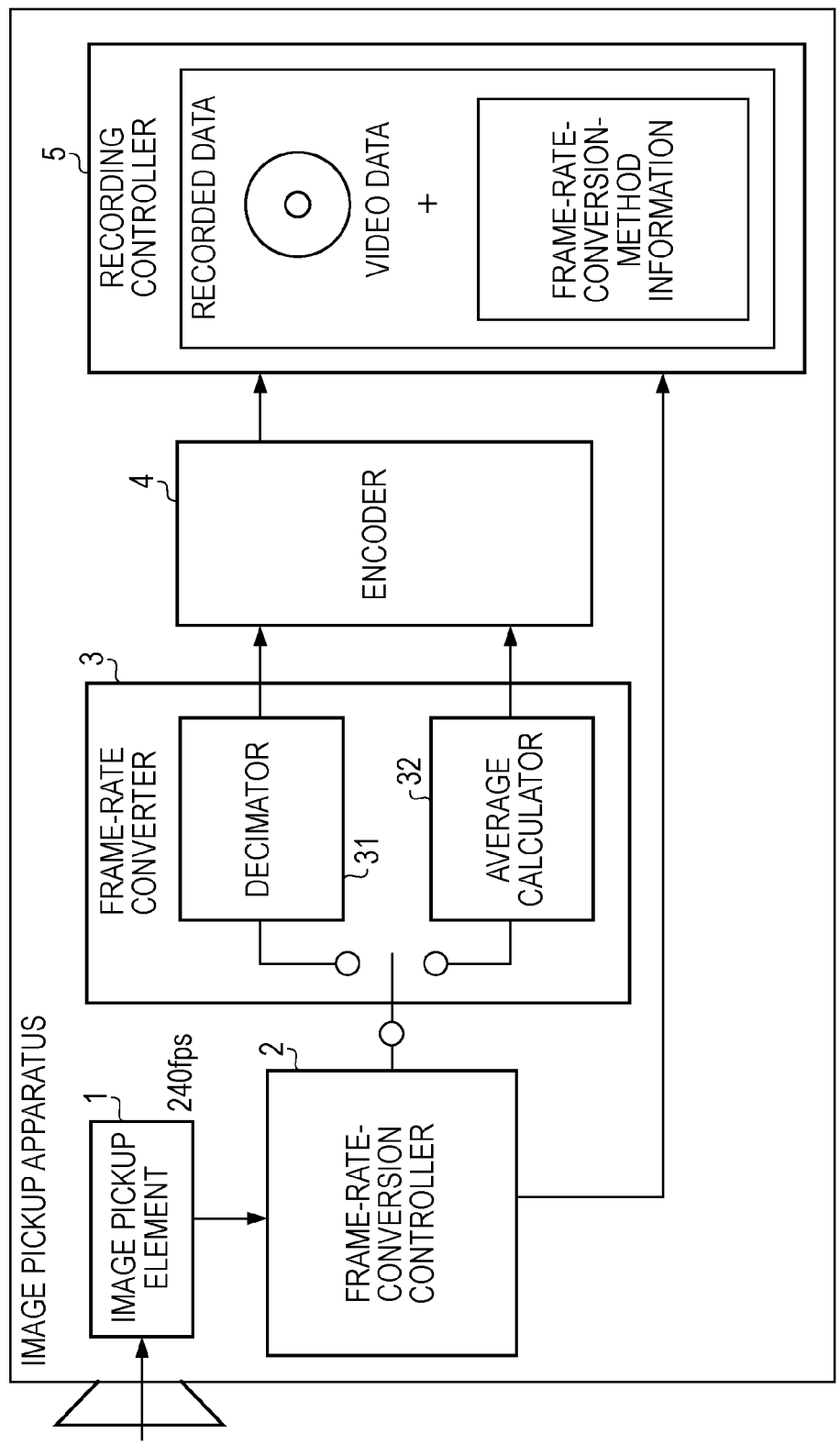
FIG. 1 is a block diagram of an image pickup apparatus according to a first embodiment.
Figure 3A:
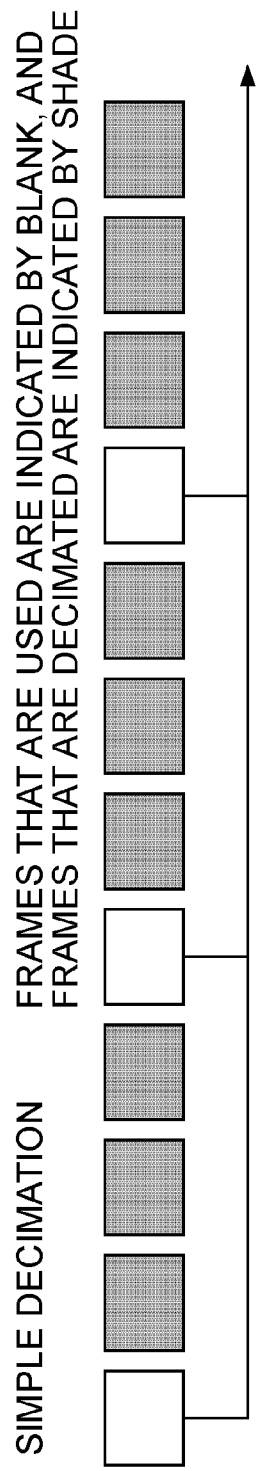
FIGS. 3A and 3B are schematic diagrams of frame-rate conversion methods according to the first embodiment.
Figure 3B:
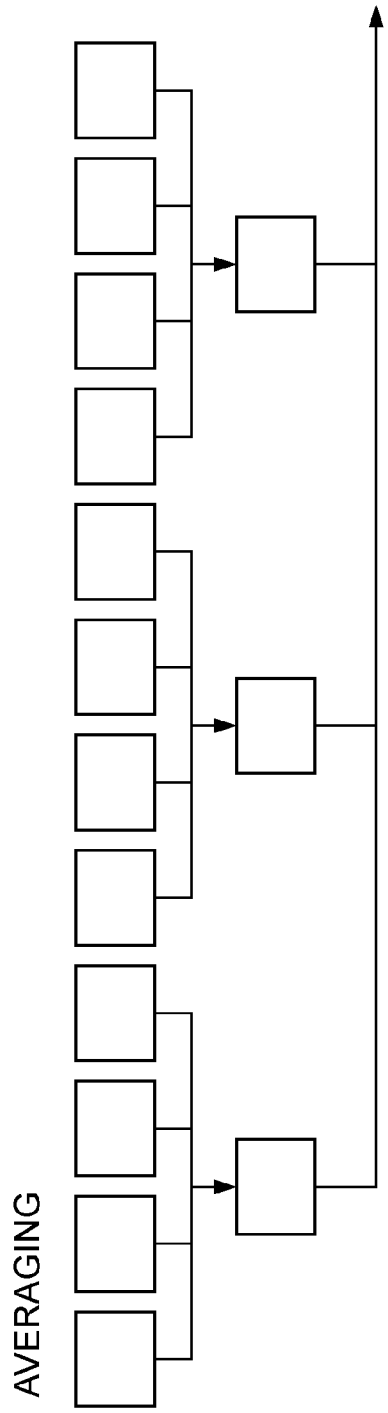

Now, embodiments of the present invention will be described with reference to the drawings. Blocks designated by the same reference numeral perform the same operation.
First Embodiment FIG. 1 is a block diagram showing the configuration of an image pickup apparatus according to a first embodiment. Referring to FIG. 1, video content that has been picked up through a lens is transferred to an image pickup element 1, and the image pickup element 1 converts the video content into video data having a first frame rate. In this embodiment, the first frame rate is 240 frames per second (FPS). The video data is converted by a frame-rate conversion controller 2 and a frame-rate converter 3 into video data having a second frame rate (60 FPS in this embodiment). The image pickup apparatus according to this embodiment supports a plurality of predetermined frame-rate conversion methods. FIGS. 3A and 3B are diagrams showing examples of frame-rate conversion methods. FIG. 3A is a schematic diagram showing a frame-rate conversion process (a decimation process) executed by a decimator 31 in which frames are decimated simply at predetermined intervals. The decimator 31 periodically selects frames that are to be used, thereby achieving a desired frame rate. In this embodiment, for the purpose of conversion from 240 FPS to 60 FPS, frames that are to be used are selected by simply selecting every fourth frame. FIG. 3B is a schematic diagram showing a frame-rate conversion process (an averaging process) executed by an averaging unit 32. The averaging unit 32 averages a plurality of frames to generate one frame, thereby achieving a desired frame rate. In this embodiment, one frame is obtained by averaging four frames.

The selection of a conversion method described above is executed by the frame-rate conversion controller 2. The selection of a conversion method may be executed automatically according to an image pickup condition or the like, or executed explicitly according to setting by a user. The video data obtained through the frame-rate conversion is encoded by an encoder 4 at a subsequent stage. Furthermore, conversion information regarding the frame-rate conversion method used for the frame-rate conversion is attached to the encoded video data under the control of a recording controller 5. The encoded video data with the attached conversion information serves as recording data.

FIG. 2 is a block diagram of a video playback apparatus.

The video playback apparatus receives the recording data via an input unit 6. The received recording data is separated into video data and frame-rate-conversion-method information by a video/information separator 7. The video data is transferred to a decoder 9, which corresponds to a playback unit, where the video data is decoded, and the decoded video data is passed to an image-quality enhancing unit 10. The frame-rate-conversion-method information is passed to a conversion-information determining unit 8, which determines the type of frame-rate conversion that has been executed and outputs corresponding processing information. On the basis of this processing information, an image-quality-enhancement controller 11 performs switching between a noise reducer 101 and an edge enhancer 102 included in the image-quality enhancing unit 10 so that processing corresponding to the processing information will be executed.

FIG. 4A is a flowchart showing an operation of the image pickup apparatus according to this embodiment. First, the frame-rate conversion controller 2 selects a frame-rate conversion method according to setting (Sa1). As described earlier, this selection may be based on an explicit instruction by the user, or executed automatically according to an image pickup condition. Then, the frame-rate converter 3 executes frame-rate conversion using the selected conversion method, and the recording controller 5 attaches conversion information corresponding to the frame-rate conversion method selected by the frame-rate conversion controller 2 to video data encoded by the encoder 4, whereby recording data is formed (Sa2).

FIG. 4B is a flowchart showing an operation executed by the playback apparatus according to this embodiment. The video/information separator 7 separates recording data received via the input unit 6 into video data and conversion information regarding a frame-rate conversion method. The video data is passed to the image-quality enhancing unit 10 via the decoder 9, and the conversion information is passed to the conversion-method determining unit 8. On the basis of the frame-rate-conversion-method information, the conversion-method determining unit 8 determines the type of frame-rate conversion that has been executed (Sb1). According to the result of determination, the image-quality-enhancement controller 11 modifies or adjusts image-quality enhancement executed by the image-quality enhancing unit 10 (Sb2). If the frame-rate conversion that has been executed is the simple decimation process, image-quality enhancement is executed normally (Sb3). If the frame-rate conversion that has been executed is the averaging process, control is exercised so as to weaken the degree of noise reduction and to strengthen the degree of edge enhancement (Sb4). Control is exercised in this manner considering that, when a plurality of frames are averaged, although noise components are reduced by averaging, contours or the like could be unsharpened. Although image-quality enhancement parameters that should be considered in this case are degrees of noise reduction and edge enhancement, image-quality enhancement parameters that should be considered at the playback apparatus change when the frame-rate conversion method changes.

The process executed by a frame-rate converter is not limited to a decimation process or an averaging process. For example, it is possible to use a method in which new frames are interpolated between frames and then a plurality of frames including the new frames are averaged to generate one frame (interpolation). Video signals of an interpolated frame may be the same as video signals of an original frame either preceding or succeeding the interpolated frame. Alternatively, video signals of an interpolated frame may be generated by averaging original frames preceding and succeeding the interpolated frame. The process of interpolating frames and the process of averaging a plurality of frames may be executed in parallel in an image processor of a frame-rate converter. In the case of the frame interpolation process, it is possible to select a type of image processing in which a frame interpolation process is not executed in the image-quality enhancing unit 10 of the playback apparatus.

Frame-rate conversion information can be transferred from the image pickup apparatus to the playback apparatus by a method in which video data is once recorded on a storage medium or recording medium (e.g., an optical disk such as a DVD or a magnetic medium such as a flash memory card) at the image pickup apparatus and the recorded video data is then passed to the playback apparatus or by a method in which video data is directly passed to the playback apparatus via a monitor interface.

In the case where a storage medium is used, frame-rate-conversion-method information can be recorded in a separate file or superposed on video data. As the storage medium, a DVD, a hard disk, an SD card, or the like may be used.

In the case where video data is directly transferred to the playback apparatus, for example, a method in which frame-rate-conversion-information is superposed on video data, or a method in which frame-rate conversion information is sent during a handshake sequence executed when the image pickup apparatus and the playback apparatus are connected, can be used.

Second Embodiment

The first embodiment relates to a video system in which conversion information regarding the type of frame-rate conversion that has been executed is used for image-quality enhancement. A second embodiment relates to a video system in which conversion information is used for adjustment of playback timing. Obviously, a video system having a combination of the functions of these video systems can be implemented.

Figure 5:
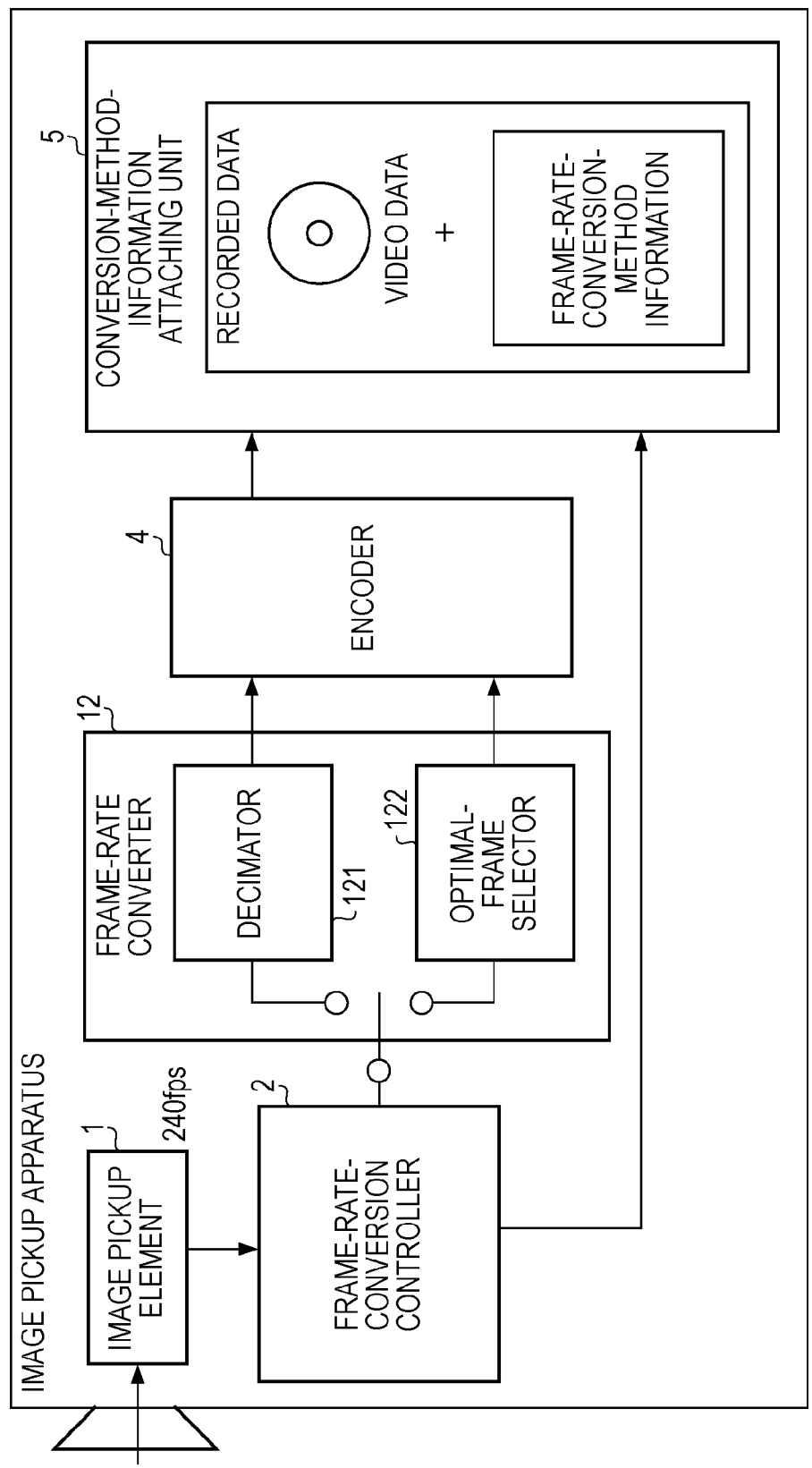
FIG. 5 is a block diagram of an image pickup apparatus according to a second embodiment.

FIG. 5 is a block diagram showing the configuration of an image pickup apparatus according to the second embodiment. A frame-rate converter 12 includes a decimator 121 that executes a simple decimation process and an optimal-frame selector 122 that executes a frame selecting process. The frame selecting process is a process of selecting frames that are favorable in terms of image quality, such as frames with little image blurring or defocusing. More specifically, a standard deviation is obtained regarding a histogram of luminance levels of image data in each frame. As the standard deviation increases, components of intermediate luminance levels decrease, so that the image becomes clearer. Thus, by selecting frames whose standard deviations are greater than or equal to a predetermined value, it is possible to select frames that are favorable in terms of image quality.

Figure 7A:
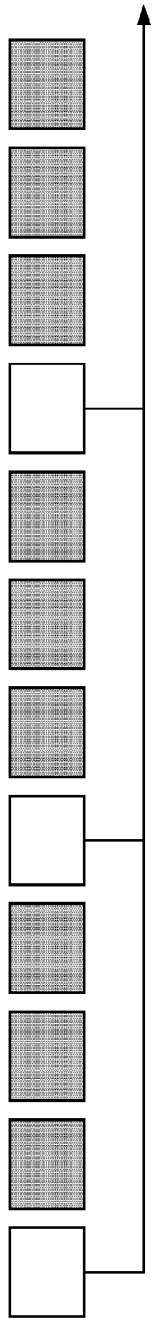
FIGS. 7A and 7B are schematic diagrams of frame-rate conversion methods according to the second embodiment.
Figure 7B:
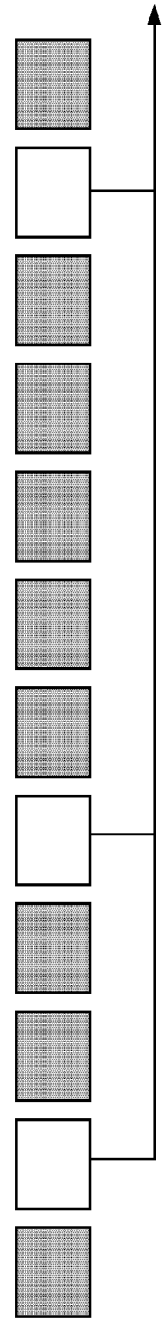

FIGS. 7A and 7B are diagrams showing examples of frame-rate conversion methods. FIG. 7A is a diagram showing the simple decimation process. A decimator 121 periodically selects frames that are to be used, according to a ratio between an original frame rate and a frame rate after frame-rate conversion, thereby achieving a desired frame rate. FIG. 7B is a schematic diagram showing the frame selecting process. Since optimal frames are selected on the basis of evaluated image quality, time intervals between selected frames are not constant. Thus, in some cases, smoothness of motion in the image is lost at the time of playback. In this embodiment, this problem is overcome by transferring to the playback apparatus information regarding corresponding positions of selected frames on the time axis of the original frame rate.

Figure 8:
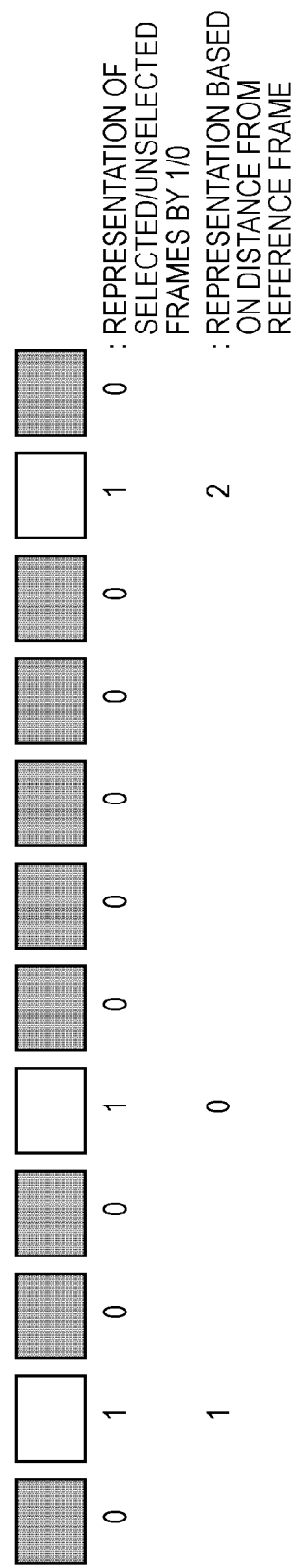
FIG. 8 is a schematic diagram of methods of representing positions of selected frames according to the second embodiment.

In FIG. 8, frames indicated by blank rectangles are selected frames selected as optimal frames, and frames indicated by shaded rectangles are unselected frames.

Furthermore, below the frames, an example where selected/unselected frames are represented by a bit sequence of 1/0 is shown. Shown further below is a sequence of numbers indicating shifts, in terms of the number of frames, of actually selected frames with respect to frames that would be selected when frames are selected periodically so as to achieve a desired frame rate.

At the playback apparatus, on the basis of position information of the selected frames, frame-rate conversion is executed again so that the frame rate matches the playback frame rate. That is, on the basis of the position information of the selected frames, the number of frames to be interpolated between selected frames or frames that are to be decimated is controlled to generate playback frames so that a smooth moving picture will be displayed.

Next, operations of the image pickup apparatus and the playback apparatus will be described further. In the image pickup apparatus, video content transferred to the image pickup element 1 via a lens is converted by the image pickup element 1 into video data having a first frame rate. The video data is converted into video data having a second frame rate by the frame-rate converter 12 under the control of the frame-rate conversion controller 2, using the method shown in FIG. 7A or FIG. 7B. The conversion method is selected by the frame-rate conversion controller 2, and this selection may be executed automatically according to an image pickup condition or the like, or executed explicitly according to setting by a user. Then, the recording controller 5 attaches frame-rate-conversion-method information shown in FIG. 8 to the video data in accordance with the selected frame-rate conversion method, whereby recording data is formed. In the case in which the selected frame-rate conversion method involves selecting frames, the frame-rate-conversion method information also includes information for use by the playback apparatus in identifying the selected frames.

Figure 6:
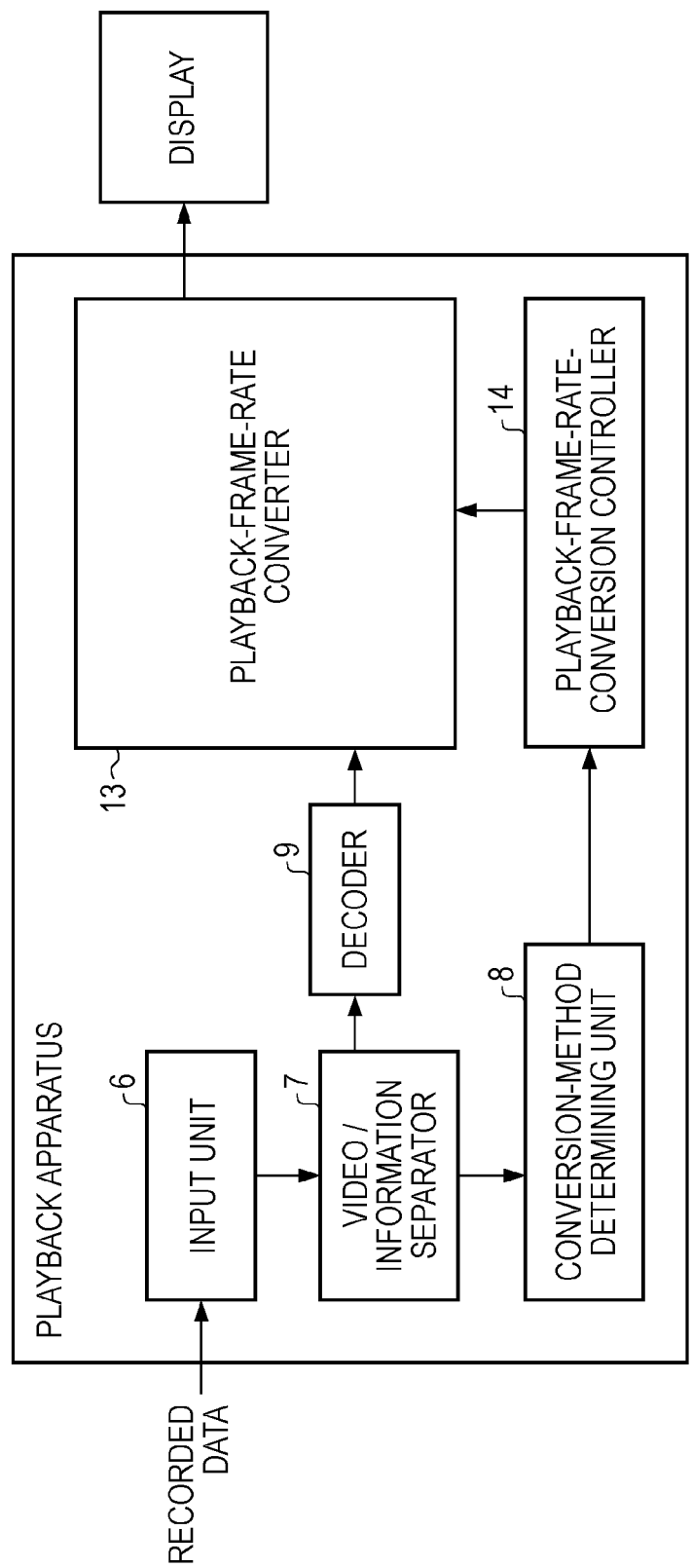
FIG. 6 is a block diagram of a playback apparatus according to the second embodiment.

In the playback apparatus (see FIG. 6), the recording data received via the input unit 6 of the playback apparatus is transferred to the video/information separator 7, where the recording data is separated into video data and conversion information regarding the frame-rate conversion method. On the basis of this conversion information, the conversion-method determining unit 8 determines the type of frame-rate conversion that has been executed, and outputs corresponding processing information. On the basis of the processing information, the playback-frame-rate conversion controller 14 selects a frame-rate conversion method. More specifically, if the frame-rate conversion executed at the image pickup apparatus is the simple decimation process and the frame rate of the video data output from the image pickup apparatus (second frame rate) is the same as the playback frame rate of the playback apparatus, playback-frame-rate conversion is not executed. If the frame-rate conversion executed at the image pickup apparatus is the simple decimation process and the frame rate of the video data output from the image pickup apparatus is not the same as the playback frame rate of the playback apparatus, playback-frame-rate conversion is executed according to a ratio between the frame rate of the video data output from the image pickup apparatus and the playback frame rate. If the frame-rate conversion executed at the image pickup apparatus involved selecting optimal frames (so that the selected frames are not at regular intervals along the time axis), playback is executed in consideration of corresponding positions of optimal frames on the time axis of the frame rate of image pickup by the image pickup apparatus (first frame rate). As noted above, information about those positions is included in the frame-rate-conversion information transferred to the playback apparatus in such cases.

The playback-frame-rate converter 13 converts the frame rate of the video signals that have been played back, using the selected conversion method.

FIG. 9A is a flowchart showing an operation of the image pickup apparatus. First, the frame-rate conversion controller 2 selects a frame-rate conversion method according to setting (Sa3). Then, the frame-rate converter 12 executes frame-rate conversion using the selected frame-rate conversion method, and the recording controller 5 attaches conversion information corresponding to the frame-rate conversion method selected by the frame-rate conversion controller 2 to video data encoded by the encoder 4, whereby recording data is formed (Sa4).

FIG. 9B is a flowchart showing an operation of the playback apparatus. The recording data received via the input unit 6 is separated by the video/information separator 7 into video data and frame-rate-conversion-method information. The video data is passed to the playback-frame-rate converter 13 via the decoder 9, and the frame-rate-conversion-method information is passed to the conversion-method determining unit 8. On the basis of the frame-rate-conversion-method information, the conversion-method determining unit 8 determines the type of frame-rate conversion that has been executed (Sb5). On the basis of the result of determination, the playback-frame-rate conversion controller 14 selects a playback-frame-rate conversion method to be executed by the playback-frame-rate converter 13 (Sb6). More specifically, if the frame-rate conversion executed at the image pickup apparatus is the simple decimation process and the frame rate of the video data output from the image pickup apparatus (second frame rate) is the same as the playback frame rate of the playback apparatus, playback-frame-rate conversion is not executed and the process ends. If the frame-rate conversion executed at the image pickup apparatus is the simple decimation process and the frame rate of the video data output from the image pickup apparatus is not the same as the playback frame rate of the playback apparatus, playback-frame-rate conversion is executed (sb10) according to a ratio between the frame rate of the video data output from the image pickup apparatus and the playback frame rate. If the frame-rate conversion executed at the image pickup apparatus involved selecting optimal frames (so that the selected frames are not at regular intervals along the time axis), playback is executed (sb11) in consideration of corresponding positions of optimal frames on the time axis of the frame rate of image pickup by the image pickup apparatus (first frame rate).

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-037799 filed Feb. 19, 2007, which is hereby incorporated by reference herein in its entirety.

What we claim is:

1. An image processing apparatus comprising:
a memory;
a processor coupled to the memory which executes the following:
receiving frame-rate-converted image signals derived from original video signals, the frame-rate-converted image signals having a lower frame rate than the original image signals, the frame-rate-converted image signals being derived from the original image signals using one of a plurality of different conversion methods;
receiving conversion information relating to a frame-rate conversion method employed to derive the frame-rate-converted image signals from the original video signals;
subjecting the frame-rate-converted video signals received by the input unit to an image-quality enhancement processing;
determining image-quality enhancement parameters for the conversion method indicated by the conversion information; and
controlling to perform the image-quality enhancement processing of the frame-rate-converted video signals using the determined image-quality enhancement parameter,
wherein said image-quality enhancement parameters is to enhance image quality of each frame constituting the received frame-rate-converted image signals.

2. The image processing apparatus according to claim 1, wherein said image-quality enhancement parameters includes at least one of degrees of noise reduction and edge enhancement.

3. The image processing apparatus according to claim 1, wherein the plurality of conversion methods include a first conversion method for obtaining frame-rate-converted image signals by selecting frames periodically from the original image signals and a second conversion method for obtaining frame-rate-converted image signals by performing an interpolation using a predetermined number of frames of the original image signals.

4. The image processing apparatus according to claim 3, wherein the image-quality enhancement processing includes a noise reduction process, and
wherein the image-quality enhancement parameters are set such that a degree of noise reduction is weaker when the conversion method is the second conversion method than when the conversion method is the first conversion method.

5. The image processing apparatus according to claim 3, wherein the image-quality enhancement processing includes an edge enhancement process, and
wherein the image-quality enhancement parameters are set such that a degree of edge enhancement is stronger when the conversion method is the second conversion method than when the conversion method is the first conversion method.

6. A control method of an image processing apparatus comprising:
receiving frame-rate-converted image signals derived from original video signals, the frame-rate-converted image signals having a lower frame rate than the original image signals, the frame-rate-converted image signals being derived from the original image signals using one of a plurality of different conversion methods, and the input unit receiving conversion information relating to a frame-rate conversion method employed to derive the frame-rate-converted image signals from the original video signals;

subjecting the frame-rate-converted video signals received to an image-quality enhancement processing; and determining image-quality enhancement parameters for the conversion method indicated by the conversion information received and controls the image-quality enhancement processing to perform the image-quality enhancement processing of the frame-rate-converted video signals using the determined image-quality enhancement parameter.

7. The control method of the image processing apparatus according to claim 6, wherein said image-quality enhancement parameters include at least one of degrees of noise reduction and edge enhancement.

8. The control method according to claim 6, wherein the plurality of conversion methods include a first conversion method for obtaining frame-rate-converted image signals by selecting frames periodically from the original image signals and a second conversion method for obtaining frame-rate-converted image signals by performing an interpolation using a predetermined number of frames of the original image signals.

9. The control method according to claim 8, wherein the image-quality enhancement processing includes a noise reduction process, and wherein setting the image-quality enhancement parameters such that a degree of noise reduction is weaker when the conversion method is the second conversion method than when the conversion method is the first conversion method.

10. The control method according to claim 8, wherein the image-quality enhancement processing includes an edge enhancement process, and wherein setting the image-quality enhancement parameters such that a degree of edge enhancement is stronger when the conversion method is the second conversion method than when the conversion method is the first conversion method.

11. An image processing apparatus comprising:
a memory;
a processor coupled to the memory which executes the following:
inputting a converted image signal obtained from an original image signal, the converted image signal having a lower frame rate than the original image signal, the converted image signal being obtained from the original image signal using one of a plurality of different conversion methods;

subjecting the converted image signal to a process for changing an image quality;

detecting a conversion method of the converted image signal;

determining a parameter for the process for changing the image quality in accordance with the detected conversion method; and controlling to perform the process for changing the image quality using the determined parameter.

12. The image processing apparatus according to claim 11, wherein the processor further executes a a noise reduction process, and the processor further executes: changing a degree of the noise reduction process in accordance with the detected conversion method.

13. The image processing apparatus according to claim 11, wherein the processor further executes an edge enhancement process, and the processor further executes: changing a degree of the edge enhancement process in accordance with the detected conversion method.

14. An image processing method comprising:
inputting a converted image signal obtained from an original image signal, the converted image signal having a lower frame rate than the original image signal, the converted image signal being obtained from the original image signal using one of a plurality of different conversion methods;

image processing to subject the converted image signal input to a process for changing an image quality;

detecting a conversion method of the converted image signal; and determining a parameter for the process in accordance with the conversion method detected and controlling the image processing to perform the process for changing the image quality using the determined parameter.

15. The image processing method according to claim 14, wherein the method further comprises a noise reduction process, and the method further comprises:

controlling, to change a degree of the noise reduction process performed in accordance with the conversion method detected.

16. The image processing method according to claim 14, wherein the method further comprises an edge enhancement process, and the method further comprises:

controlling, to change a degree of the edge enhancement process performed by the image processing in accordance with the conversion method detected.

* * * * *